United States Patent [19]

Trä

[11] 4,190,522
[45] Feb. 26, 1980

[54] APPARATUS FOR PURIFYING A SUSPENSION OF FIBROUS MATERIAL

[75] Inventor: Josef Trä, Heidenheim, Fed. Rep. of Germany

[73] Assignee: J. M. Voith GmbH, Heidenheim, Fed. Rep. of Germany

[21] Appl. No.: 927,558

[22] Filed: Jul. 24, 1978

[30] Foreign Application Priority Data

Aug. 17, 1977 [DE] Fed. Rep. of Germany ....... 2737009

[51] Int. Cl.$^2$ ............................................. B03D 1/24
[52] U.S. Cl. ....................................... 209/170; 162/4; 210/221 P
[58] Field of Search ............... 209/170, 173, 454, 474, 209/475, 476, 466, 468, 168; 162/4, 5; 210/221 R, 221 P

[56] References Cited

U.S. PATENT DOCUMENTS

| 2,005,742 | 6/1935 | Hines | 162/5 |
| 3,479,281 | 11/1969 | Kikindai et al. | 209/170 X |
| 3,804,250 | 4/1974 | Dankesreiter | 209/475 |

FOREIGN PATENT DOCUMENTS

| 766589 | 6/1934 | France | 209/475 |
| 1242055 | 8/1971 | United Kingdom | 209/474 |
| 1370801 | 10/1974 | United Kingdom | 209/474 |

Primary Examiner—Ralph J. Hill
Attorney, Agent, or Firm—Albert L. Jeffers; Robert G. Irish

[57] ABSTRACT

Apparatus for removing impurities entrapped in a suspension of fibrous material includes a fluidized bed chamber having opposite ends, a top wall, and a perforated bottom wall. An inlet feeds the suspension to be purified to a diffusing chamber which imparts laminar flow thereto and, in turn, feeds the suspension to the fluidized bed chamber through one end thereof for flow across the bottom wall toward the other end. A pressure chamber is positioned below the fluidized bed chamber and communicates with the bottom wall thereof, the pressure chamber having a plurality of walls thereacross dividing the same into a plurality of sections. A manifold has branches communicating with each section of the pressure chamber for introducing a fluidizing agent under pressure thereto for upward flow through the perforations in the bottom wall and through the suspension therein thereby to separate impurities from the suspension by flotation. A separation chamber has a forward end communicating the other end of the fluidized bed chamber for receiving the suspension therefrom and has top and bottom walls and a rear wall. A light impurities withdrawal conduit extends upwardly from the top wall of the separation chamber in the forward region thereof for removing separated impurities from the suspension which have relatively low specific gravity and float to the top thereof. A fibrous suspension withdrawal conduit extends from the rear upper region of the separation chamber for removing the purified fibrous suspension therefrom, and a heavy impurity withdrawal conduit extends from the lower region of the separation chamber for removing separated impurities from the suspension which have relatively high specific gravity and settle to the bottom wall of the separation chamber.

9 Claims, 3 Drawing Figures

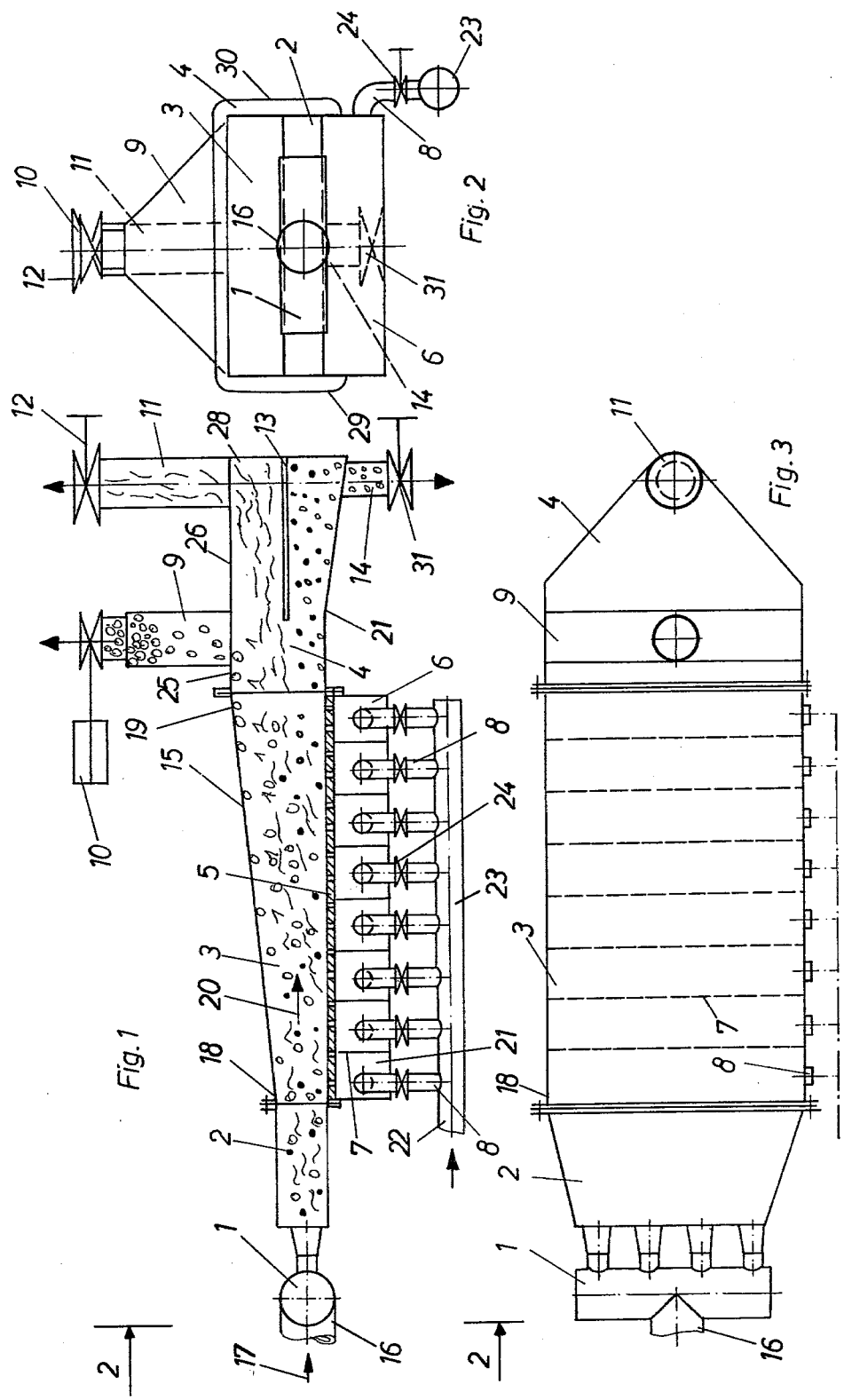

APPARATUS FOR PURIFYING A SUSPENSION OF FIBROUS MATERIAL

BACKGROUND OF THE INVENTION

1. Field of the Invention

This invention relates generally to fluidized bed apparatus for removing impurities entrapped in a suspension of fibrous material.

2. Description of the Prior Art

Fluidized bed apparatus for removing printing ink from a suspension of fibrous materials by flotation is disclosed in West German Published Pat. Application No. 2 161 015. That application discloses apparatus in which the fluidized bed chamber has an upwardly facing, open top from which the floated ink-bearing foam is removed by a paddle arrangement. By reason of the open top, unpleasant odors could escape to the surrounding atmosphere and impure water could be splashed out of the fluidized bed chamber.

SUMMARY OF THE INVENTION

It is desirable to provide fluized bed apparatus for separating both light and heavy impurities from a suspension of fibrous material with minimum pollution of the surrounding atmosphere. Therefore, in accordance with the invention in its broader aspects, a fluidized bed chamber is provided having spaced opposite ends, a top wall, and perforated bottom wall. Means is provided for introducing a suspension to the fluidized bed chamber through one end thereof for flow across the bottom wall toward the other end. A pressure chamber is disposed below the fluidized bed chamber and communicates with the bottom wall, and means is provided for introducing a fluidizing agent under pressure to the pressure chamber for upper flow through the perforations in the bottom wall of the fluidized bed chamber and through the suspension therein thereby to separate the impurities from the suspension by flotation. A separation chamber is provided having a forward end communicating with the other end of the fluidized bed chamber for receiving the suspension therefrom and having top and bottom walls and a rear wall. The separation chamber has at least one opening in the forward region of its top wall for removing separated impurities from the suspension which have relatively low specific gravity and thus float to the top thereof. The separation chamber further has another opening in its rear lower region for removing separated impurities from the suspension which have relatively high specific gravity and thus settle to the bottom wall thereof, and an outlet opening in its rear upper region and rearwardly of the one opening for removing the purified fibrous suspension therefrom.

It is accordingly an object of the invention to provide improved fluidized bed apparatus for separating impurities from a suspension of fibrous material.

Another object of the invention is to provide improved, fluidized bed apparatus for separating impurities from a suspension of fibrous material wherein pollution of the surrounding atmosphere by unpleasant odors by splashing impure water is eliminated.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a side, cross-sectional view schematically showing the apparatus of the invention;

FIG. 2 is a front view of the apparatus of FIG. 1 taken generally along the line 2—2 thereof; and FIG. 3 is a top, plan view of the apparatus of the invention.

DESCRIPTION OF THE PREFERRED EMBODIMENT

Referring now to the figures of the drawing, inlet chamber 1 receives the suspension of fibrous material to be purified under low pressure from inlet conduit 16, as shown by arrow 17. Inlet chamber 1 introduces the fibrous material suspension to be purified to diffusing chamber 2 which eliminates turbulence and imparts laminar flow to the suspension. Diffusing chamber 2 is connected to end 18 of fluidized bed chamber 3 which has perforated bottom wall 5 and top wall 15 which is inclined unwardly from end 18 toward the opposite end 19. Thus, the fibrous material suspension to be purified is caused to flow across perforated bottom wall 5 from end 18 to end 19 of fluidized bed chamber 3, as indicated by arrow 20.

Pressure chamber 6 is positioned below perforated bottom wall 5 of fluidized bed chamber 3 and communicates therewith. Pressure chamber 6 has a plurality of spaced walls 7 extending thereacross which respectively form sections 21. Fluidizing agent inlet conduit 22 is connected to manifold 23 which has a plurality of branches 8 respectively communicating with sections 21 of pressure chamber 6; branches 8 respectively have cut-off valves 24 therein. Manifold 23 and its branches 8 supply a suitable fluidizing agent under pressure, such as air, steam or other gas, water or a suitable chemical agent, to pressure chamber 6 for upward flow through the perforations in wall 5 and upwardly flow through the suspended fibrous material in fluidized bed chamber 3 thereby to separate impurities therefrom by flotation. Thus, the upward flow of the fluidizing agent through the fibrous material suspension in fluidized bed chamber 3 creates a buoyancy or flotation action transversely of the direction of flow 20 of the suspended fibrous material so that the light impurity particles which offer a low resistance to the upward flow or particles which are spherical in shape are entrained in the upward flow of flotation agent whereas, particles in the suspension which offer a greater resistance to the upward flow, such as the fibers of the fibrous material and heavier impurity particles, remain entrained in the suspended state.

Separation chamber 4 is provided having front end 25, top and bottom walls 26, 27 and rear wall 28. Separation chamber 4 has its front end 25 connected to and communicating with rear end 19 of fluidized bed chamber 3. Conduit 9, preferably generally funnel-shaped as shown in FIG. 2, communicates with separation chamber 4 and extends upwardly from top wall 26 in the forward region thereof. Shut-off valve 10 is arranged at the top of conduit 9. Another conduit 11 communicates with separation chamber 4 and extends upwardly from top wall 26 adjacent rear wall 28. Conduit 11 has shut-off valve 12 therein. Separation plate 13 extends forwardly from rear wall 28 toward front end 25 of separation chamber 24 generally midway between top and bottom walls 26, 27 and extends transversely between side walls 29, 30 (FIG. 2). Conduit 14 communicates with separation chamber 4 and extends downwardly from bottom wall 27 adjacent rear wall 28. Conduit 14 has shut-off valve 31 therein.

The impurity particles of the lowest apparent bulk weight separated from the fibrous material suspension, such as synthetic polymers or printing ink, will rise in separation chamber 4 and collect in conduit 9, and may be removed from time to time by opening shut-off valve 10, which may be pneumatically controlled. The purified fibrous suspension accumulates in the rear region of separation chamber 4 above separation plate 13 and may be removed through withdrawal conduit 11 by operation of shut-off valve 12. The heavier separated impurity particles settle to the bottom wall 27 of separation chamber 4 beneath separation plate 13 and may be removed periodically through conduit 14 by operation of shut-off valve 31.

It will now be seen that with the apparatus of the invention, impurities having different specific weights and different apparent bulk weights may be removed from a suspension of fibrous material. Thus, while the apparatus may be employed for removing ink from fibrous materials, it may additionally be employed for removing other impurities such as synthetic polymers, latex, and the like. It will be seen that the apparatus of the invention may be operated under pressure in a closed system thus eliminated pollution of the surrounding area due to unpleasant odors escaping and/or due to splashing of impure water. It will be seen that with pressure chamber 6 subdivided into a number of separate sections 21, it is possible to apply several different flotation agents or reagents in sequence, one after the other.

It will be seen that various fluidizing agents may be employed, such as air, steam or other gases, water or a chemical reagent. It will also be understood that the fibrous materials to be purified may be suspended in water, air or another suitable vehicle. It will be understood that by adjustment of the injection of the flotation agent and/or adjustment of the feed pressure of the suspension entering inlet chamber 1, the conditions of flotation and settling of impurities may be adjusted over a rather wide range. The provision of the upperwardly inclined top wall 15 of fluidized bed chamber 3 enhances the rising by flotation of the separated lighter weight particles and thus aids in the separation process.

It will be understood that the lighter weight impurities removed by conduit 9 may be subjected to subsequent treatment in sorting and/or dehydration apparatus, and that the heavier weight impurities removed through conduit 14 may also be subjected to further treatment.

It will be understood that fluidized bed chamber 3 and/or separation chamber 4 may be cylindrical or conical in configuration in which case, separation may be aided by tangential feeding of the fibrous material suspension thereto.

While there have been described above the principles of this invention in connection with specific apparatus, it is to be clearly understood that this description is made only by way of example and not as a limitation to the scope of the invention.

What is claimed is:

1. In apparatus for removing impurities entrapped in a liquid suspension of fibrous material including a generally horizontal fluidized bed chamber having spaced opposite ends, an imperforate top wall, and a perforated bottom wall, first means for introducing said suspension to said fluidized bed chamber through one end thereof for flow across said bottom wall toward the other end, the space between said bottom and top walls being filled with said liquid suspension from said one and to said other end of said fluidized bed chamber, a pressure chamber below said fluidized bed chamber and communicating with said bottom wall, and second means for introducing a fluidizing agent under pressure to said pressure chamber for upward flow through the perforations in said bottom wall and through the suspension in said fluidized bed chamber thereby to separate impurities from said suspension by flotation, the improvement comprising: a separation chamber having a forward end communicating with the other end of said fluidized bed chamber for receiving said suspension therefrom and having top and bottom walls and a rear wall, said separation chamber having at least one withdrawal opening in the forward region of said top wall for removing separated impurities from said suspension which have relatively low specific gravity and thus float to the top thereof, said separation chamber having at least one discharge opening in its rear lower region for removing separated impurities from said suspension which have relatively high specific gravity and thus settle to the bottom wall thereof, said last-named bottom wall being imperforate apart from said discharge opening, said separation chamber having at least one outlet opening therein in its rear upper region rearwardly of said one opening for removing the purified fibrous suspension therefrom.

2. The apparatus of claim 1 further comprising a light impurities withdrawal conduit extending upwardly from said withdrawal opening in said top wall of said separation chamber and having a shut-off valve therein.

3. The apparatus of either claim 1 or claim 2 further comprising a fibrous suspension withdrawal conduit extending from said outlet opening in said separation chamber and having a shut-off valve therein.

4. The apparatus of claim 3 wherein said first introducing means includes a diffusing chamber for providing laminar flow of said suspension into said fluidized bed chamber, said pressure chamber has a plurality of walls thereacross dividing the same into a plurality of sections, said second introducing means including a manifold having a plurality of branches respectively connected to said pressure chamber sections and each having a control valve therein, said top wall of said fluidized bed chamber being inclined upwardly from said one end toward said other end, and wherein said separation chamber has an imperforate separation baffle therein extending horizontally forwardly from said rear wall and disposed above said discharge opening and below said outlet opening, and further comprising a heavy impurity withdrawal conduit extending from said discharge opening in said separation chamber and having a shut-off valve therein.

5. The apparatus of claim 1 wherein said first introducing means includes a diffusing chamber for providing laminar flow of said suspension into said fluidized bed chamber.

6. The apparatus of claim 1 wherein said pressure chamber has a plurality of walls thereacross dividing the same into a plurality of sections, said second introducing means including a manifold having a plurality of branches respectively connected to said pressure chamber sections and each having a control valve therein.

7. The apparatus of claim 1 wherein said top wall of said fluidized bed chamber is inclined upwardly from said one end toward said other end.

8. The apparatus of claim 1 wherein said separation chamber has an imperforate separation baffle therein extending horizontally forwardly from said rear wall and disposed above said discharge opening and below said outlet opening.

9. The apparatus of claim 1 further comprising a heavy impurity withdrawal conduit extending from said discharge opening in said separation chamber and having a shut-off valve therein.

* * * * *

UNITED STATES PATENT AND TRADEMARK OFFICE
CERTIFICATE OF CORRECTION

PATENT NO. : 4,190,522
DATED : February 26, 1980
INVENTOR(S) : Dipl.-Ing. Josef Tra It is certified that error appears in the above–identified patent and that said Letters Patent are hereby corrected as shown below:

Claim 1, Column 4, Line 4, "and" should be -- end --

Signed and Sealed this

Twenty-eighth Day of October 1980

[SEAL]

*Attest:*

SIDNEY A. DIAMOND

*Attesting Officer*     *Commissioner of Patents and Trademarks*